United States Patent [19]

Zeavin

[11] Patent Number: 4,605,978
[45] Date of Patent: Aug. 12, 1986

[54] CLIP SYSTEM FOR IMMOVEABLY MOUNTING A MAGNETIC HEAD ON A SUPPORT

[76] Inventor: Mark Zeavin, 27 E. Las Flores Dr., Altadena, Calif. 91001

[21] Appl. No.: 674,214

[22] Filed: Nov. 23, 1984

[51] Int. Cl.⁴ .................. G11B 5/50; G11B 21/16; A41F 1/00; B42F 1/08
[52] U.S. Cl. .................. 360/104; 24/457; 24/458; 24/545; 24/555; 24/563
[58] Field of Search .................. 360/104; 24/457, 458, 24/545, 563, 555

[56] References Cited

U.S. PATENT DOCUMENTS 3,021,581  2/1962  Cook et al. .................. 24/457
3,767,209 10/1973  Seehawer .................. 360/104
3,978,522  8/1976  Rothlisberger et al. .................. 360/104

*Primary Examiner*—Robert S. Tupper
*Attorney, Agent, or Firm*—Nilsson, Robbins, Dalgarn, Berliner, Carson & Wurst

[57] ABSTRACT

A clip system for mounting a magnetic head on a support includes a support having at least one upwardly extending flange for holding the head immoveable in at least one direction along a first dimension. The head has at least one index cavity in its upfacing surface. A clip is positioned with one leg pressing down on the top of the head and another positioned against the bottom of the support to hold the head immoveable against the support along a second dimension perpendicular to the first dimension. The clip is fixed in a suitable manner to the support and has at least one inward protrusion or tang sized to fit tightly in each of the index cavities. The cavities and tangs in conjunction with the fixing of the clip to the support, cooperate to prevent relative movement between the support and the head in a third dimension perpendicular to the first and second dimensions and further cooperate to effect registration of the head along the third dimension when the clip is in its engaged position with the head and the support.

26 Claims, 7 Drawing Figures

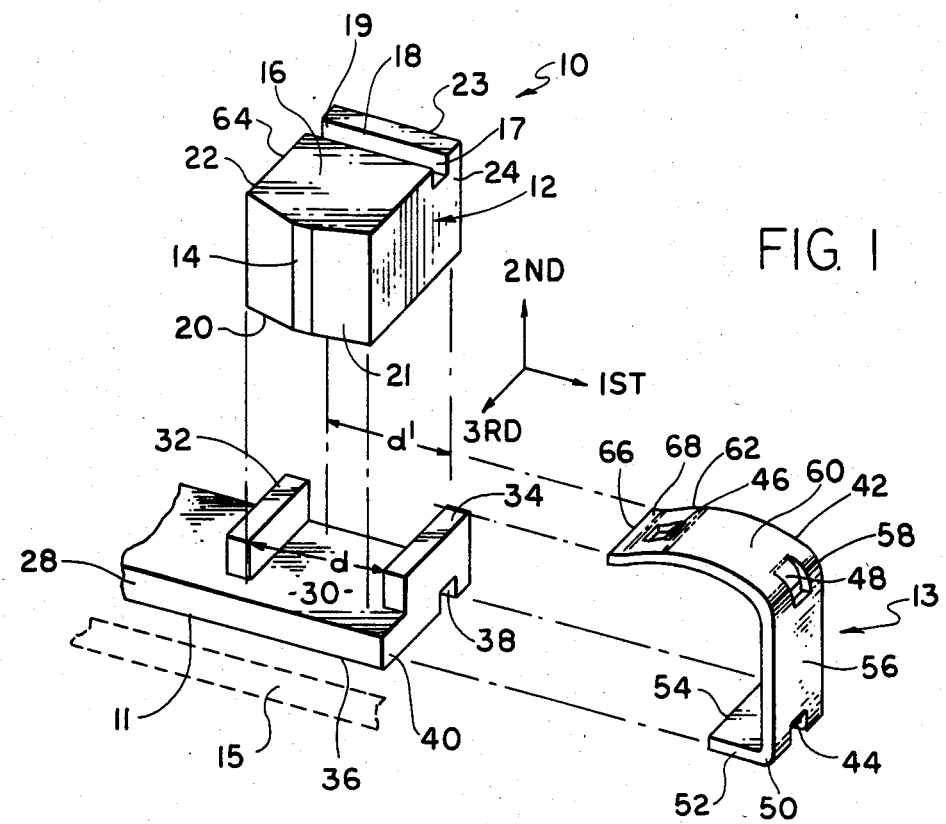
FIG. 1
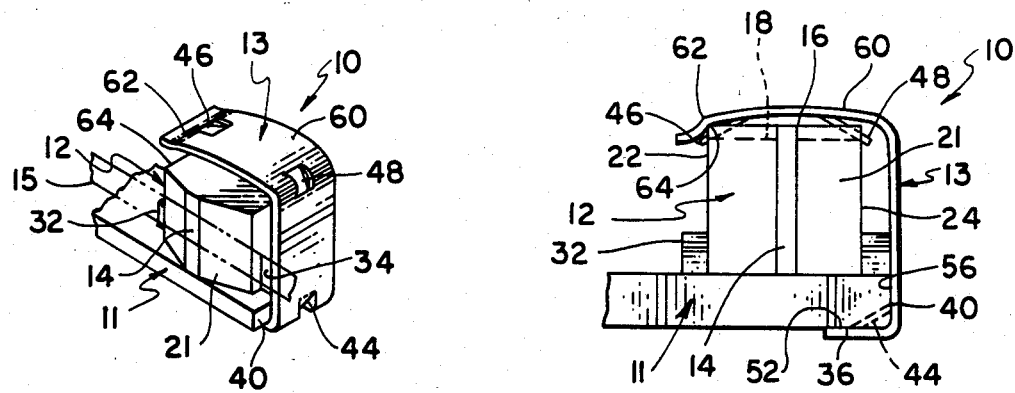
FIG. 2
FIG. 3

CLIP SYSTEM FOR IMMOVEABLY MOUNTING A MAGNETIC HEAD ON A SUPPORT

BACKGROUND OF THE INVENTION

The present invention relates to clips and in particular to a clip system for mounting an object to a support whereby the clip system prevents movement in each of three orthogonal directions to achieve a predefined registration positioning for the object.

Numerous types of magnetic recording devices which receive magnetic tape cartridges are known. One particular style of magnetic recording devices incorporates a moveable support member upon which the magnetic head of the recorder is placed. In general, the support member pivots relative to the cartridge to bring the head into contact against the magnetic recording surface such as a tape. In order to achieve proper registration and positioning of the head relative to the magnetic tape, it is essential that the magnetic head be mounted on the support in a manner that will prevent relative movement between the magnetic head and the support while at the same time providing proper positioning and orientation for the portion of the head which comes in contact with the magnetic recording surface. It is therefore desired to provide a clip mechanism which is inexpensive and which is readily adapted to mass production techniques so as to eliminate the requirement for extensive labor or precision adjustment to properly position the head relative to the support.

The present invention achieves this result by utilizing at least one upstanding registration flange extending from the top support surface of the support member; providing a means of attaching a clip to the support member; and providing at least one index cavity in the top of the magnetic head. The clip has at least one inwardly directed protrusions or tangs. At least some of the tangs extend into the index cavities in the top surface of the head to both position the head relative to the support in a predefined manner and simultaneously maintain the head immoveable relative to the support.

In one embodiment the head is placed on the support between two registration flanges. The clip is inserted over the end of the support around both the head and the support. This operation can be easily done in an assembly line process by an assembler having minimal skills. Precise registration of the head relative to the magnetic recording surface is achieved upon engagement of the tangs in the index cavities without the necessity of precision adjustments.

SUMMARY OF THE INVENTION

The clip system in accordance with the invention enables the mounting of an object having a first side and a second side, generally opposite each other, on a support so that the object is held substantially immoveable in each of three orthogonal dimensions. The clip system includes a support member, an object to be mounted to the support member, and a clip. The support member has a top support surface, a bottom support surface opposite the top support surface, and an outer edge defining a connecting surface between the top support surface and the bottom support surface. At least one registration flange extends from the top surface in a direction away from the top support surface. In one embodiment, first and second registration flanges are provided which are spaced apart from each other by a first distance with the second registration flange being nearer the outer edge than the first registration flange. The support may further have a support notch in the corner region between the outer edge and the bottom support surface.

The object (herein also referred to as the head) has a bottom head surface, a top head surface opposite the bottom head surface, a front head surface connecting the top and bottom head surfaces and having a magnetic contact area extending generally between the top and bottom surfaces, a first side surface and a second side surface. In the embodiment where there are two registration flanges, the head is positioned between the first and second registration flanges with the bottom head surface adjacent the top support surface. The distance between the registration flanges and width of the head between the first and second sides are preferable substantially the same so that the head fits in the space between the registration flanges with the registration flanges abutting against the respective side surfaces of the head to inhibit side-to-side movement of the head between the first and second registration flanges. The head further includes at least one index cavity in the top head surface.

The clip is generally C-shaped and includes a base portion, an edge portion, a first bend between the base portion and the edge portion, an arch portion, a second bend between the arch portion and the edge portion remote from the first bend, a lip portion, a third bend between the lip portion and the arch portion remote from the second bend, a first indentation or tang adjacent the second bend and a second indentation or tang adjacent the third bend. The base portion is engaged in a suitable manner to the support so as to be immovably fixed relative to the support when the clip is engaged about the object and support.

The clip is dimensioned so that the base portion is against the bottom support surface and the arch portion presses down against the top head surface to hold the head with the bottom head surface immoveably pressed against the top support surface by the spring-like characteristic of the clip. The means of engaging the object and the support may comprise a notch indentation or tang which engages with the support notch. The first and second tangs extend into and fit tightly in the index cavity or cavities.

The arch portion may be sized so that the third bend fits over the corner region between the top head surface and the first side surface. Thus, the notch tang and the first and second tangs hold the object immoveable parallel to the registration flanges. The notch tang and the first and second tangs are positioned in fixed relationship to each other so as to position the object relative to the support in a predefined position whereby the object is in proper registration when the support is rotated into engagement.

BRIEF DESCRIPTION OF THE DRAWINGS

In the drawings, which constitute a part of this specification, exemplary embodiment demonstrating the various objectives and features hereof are set forth as follows:

FIG. 1 is an exploded perspective view of the clip system in accordance with the present invention.

FIG. 2 is a perspective view of the assembled clip system of FIG. 1.

FIG. 3 is a front elevational view of the clip system of FIG. 2.

DETAILED DESCRIPTION

Figure 4:
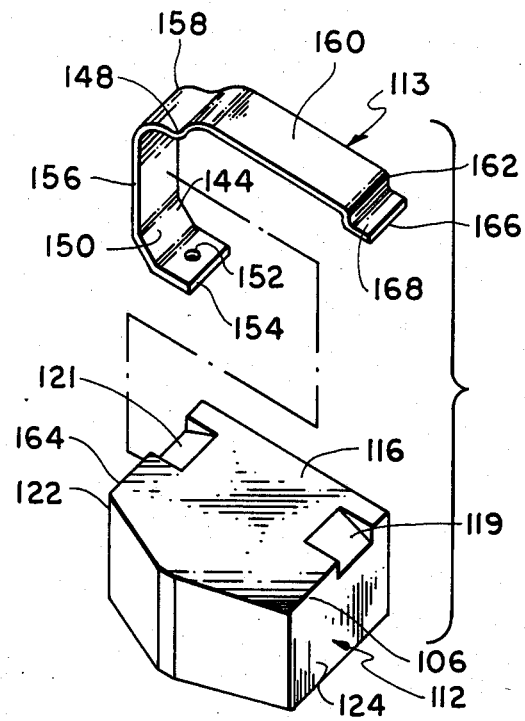
FIG. 4 is an exploded perspective view of a second embodiment of a clip system in accordance with the present invention.

Referring initially to FIG. 1, a first embodiment of the system 10 in accordance with the invention, includes a support 11, an object such as a magnetic head 12, and a spring clip 13 for immoveably holding the head on the support 11 in a predefined registration position. The magnetic head 12 has a contact area 14 for touching a magnetic tape 15 or other magnetic storage media to provide recording through conventional magnetic coils located inside the head 12. The tape 15 sweeps across the contact area 14 to effect reading and writing. In order to achieve optimum recording, the contact area 14 must remain in the proper vertical and horizontal registration with the tape 15.

The head 12 may be a generally cubic shape with a top surface 16, a bottom surface 20 generally parallel to the top surface 16, a front surface 21 extending between the top and bottom surfaces 16 and 20 respectively, a back surface 23 generally opposite the front surface 21, and first and second side surfaces 22 and 24 extending vertically between the top and bottom surfaces 16 and 20 and horizontally between the front and back surfaces 21 and 23 respectively. A groove 18 defining first and second index cavities 17 and 19 respectively, is formed in the top surface 16. The first index cavity 17 is preferably located in the corner region between the top surface 16 and the second side surface 24 and the second index cavity 19 is preferably located in a corner region 64 between the top surface 16 and the first side surface 21. The first and second index cavities 17 and 19 may be distinct and independent cavities as illustrated in FIGS. 4–7 or may be different regions of a single elongated groove such as the single head groove 18 in FIGS. 1–3 which extends between the two side surfaces 22 and 24 generally parallel to the front and back surfaces 21 and 23.

The head 12 is positioned on the support 11 which may be part of an arm 28. The support 11 has a top support surface 30 with a first registration flange 32 extending up from an inner position of the support surface 30 and a second registration flange 34 extending up from an outer position of the support surface 30. The first and second registration flanges 32 and 34 are spaced apart a distance d substantially equal to the width d' of the head 12 between the first and second side surfaces 22 and 24.

In operation, the head 12 is positioned with its bottom surface 20 adjacent the top support surface 30 of the support 11 with the first side surface 22 adjacent to the first registration flange 32 and the second side surface 24 of the head adjacent the second registration flange 34. The first and second registration flanges 32 and 34 prevent side-to-side movement of the head 12 on the support 11.

The support 11 has a lower support surface 36 and an outer edge 40 between the top support surface 30 and the lower support surface 36. An support notch 38 is preferably disposed in the corner region between the lower support surface 36 and the outer edge 40. The head 12 is preferrably positioned in the space between the registration flanges 32 and 34 so that the head groove 18 and the support notch 38 are aligned.

The spring clip 13 is "C" or "J" shaped having a base portion 52 beginning at a first end 54. The base 52 transitions at a first bend 50 to an edge portion 56 generally perpendicular to the base 52. The edge portion 56 transitions at a second bend 58 to an arch portion 60 generally perpendicular to the edge portion 56. The arch portion 60 transitions at a third bend 62 to a lip portion 68. The spring clip 13 finally terminates at a second end 66 of the lip portion 68.

The spring clip 13 preferably has a notch indentation or tang 44 located so as to engage the support notch 38, a first tang 48 adjacent the second bend 58 and a second tang 46 generally adjacent the third bend 62. The width of the first and second tangs 48 and 46 are substantially the same as the width of the head groove 18. The width of the notch tang 44 is substantially the same as the width of the support notch 38.

In operation, the head 12 is positioned on the top support surface 30 between the first and second registration flanges 32 and 34. The spring clip 13 is then pressed over the outer edge 40 of the support 11 and over the head 12 with the base portion 52 pressing upwardly against the bottom support surface 36 with the first bend 50 generally conforming to the corner region between bottom support surface 36 of the support 11 and the outer edge 40 of the support 11. The notch tang 44 is located for extending into and fitting tightly in the support notch 38. The edge portion 56 of the clip 13 is positioned opposite the second side surface 24 of the head 12 with the arch portion 60 extending over and pressing down on the top head surface 16 with the lip portion 68 adjacent the first side surface 22. The first tang 48 fits into the first index cavity 17 of the head groove 18 at approximately the corner between the top surface 16 and the second side surface 24 of the head 12. The second tang 46 fits into the second index cavity 19 of the head groove 18 at approximately the corner between the top surface 16 and the first side surface 22 of the head 12.

The tangs 46 and 48 and 44, being about the same width as the first and second index cavities 17 and 19 and support notch 38 respectively, further prevent movement of the head 12 parallel to the registration flanges 32 and 34. By proper positioning of the tangs, registration flanges, support notch and index cavities, the clip 13 will hold the head 12 immoveable in each of three orthogonal dimensions on the support 11 at a preselected position for being properly registered with the tape 15 to read onto and from the tape 15.

When the head 12 is to be positioned on the support 11 the head 12 is initially positioned in the support 11 in approximately the proper location. Misalignment of the head 12 in the support 11 will be readily apparent by the difficulty of inserting the tangs 44, 46 and 48 in the index cavities 17 and 19 and the support notch 38 when the clip 13 is inserted over the head 12 and support 11. Once the tangs 44, 46 and 48 are initially inserted in the index cavities 17 and 19 and the support notch 38, the spring of the clip 42 urges the head 12 to the proper position until the clip 13 seats in a least flexed position. When the clip 13 is completely released by the assembler, the clip 13 holds the head 12 securely against the support surface 60 and the tangs 44, 46 and 48 prevent movement of the head 12.

The clip 13 is fabricated with several features designed to aid in positioning and holding the head 12, the support 11, and the clip 13 together. The angle of the first bend 50 preferably matches the angle between the bottom support surface 36 and edge surface 40 of the support 11. The notch tang 44 and the first and second tangs 48 and 46 may be formed by making parallel cuts and then pushing portions between the cuts toward the inside of the clip 13. Both ends of each tang at the ends of the parallel cuts may remain attached to the main body of the clip 13 and the tang formed by stretching the material. Alternatively, one end region between the parallel cuts may be transversely cut and the resulting tongue of material pushed toward the inside of the clip 13.

The upper part of the clip 13 is the arch portion 60 between the second bend 58 and the third bend 62. The arch portion 60 assures that only the area of the clip 13 adjacent the third bend 62 presses against the head 12 and then only at the upper corner 64 of the head 12 farthest from the index notch 38. The head 12 is thereby firmly wedged into the corner of the support 11 at the intersection of the top support surface 30 and the registration flange 34. Accordingly, it will be apparent that the innermost or first registration flange 32 is not absolutely essential and may in some embodiments be eliminated.

Between the third bend 62 and the second end 66 of the clip 13 the lip portion 68 may have a reverse curve away from the inner part of the clip 13. The reverse curve of the lip portion 68 facilitates the sliding of the second end 66 across the upper surface 16 of the head 12 during assembly. The spring clip 13 is fabricated to press against the head 12 after the clip 13 is released by the assembler. The unflexed position of the second end 66 is therefore below the level of the upper surface 16 and the assembler must pull the clip 42 in order to initially place the second end 66 on the upper surface 16. The clip 13 exerts force downward against the upper surface 16 during assembly. The reverse curve of the lip portion 68 allows the second end 66 to slide across the upper surface 16 to the corner 64 instead of digging into the upper surface 16.

During assembly, the tang 46 is initially positioned in the index groove 18. As the second end 66 is slid across the upper surface 16 and over the corner 64, the tang 48 also enters the index groove 18 if the head 12 is properly positioned in the support 11. If the head 12 is not properly positioned to allow the tang 48 to enter the index groove 18, the assembly is immediately made aware of the problem because the third bend 62 will not seat at the corner 64. Adjustment of the head 12 in the support 11 to the proper position then allows the tang 48 to enter the index groove 18.

In FIG. 2 the head 12 is properly positioned in the support 11 with the tangs 44, 46 and 48 registered in the index notch 38 and index groove 18 with the third bend 62 locked over the corner 64.

In FIG. 3 the notch tang 44 is registered in the support notch 38 and the first and second portions 52 and 56 of the clip 42 are seated against the lower and end surfaces 36 and 40 of the support 11. The tangs 46 and 48 are registered in the index groove 18 and the third bend 62 is locked over the corner 64.

Figure 6:
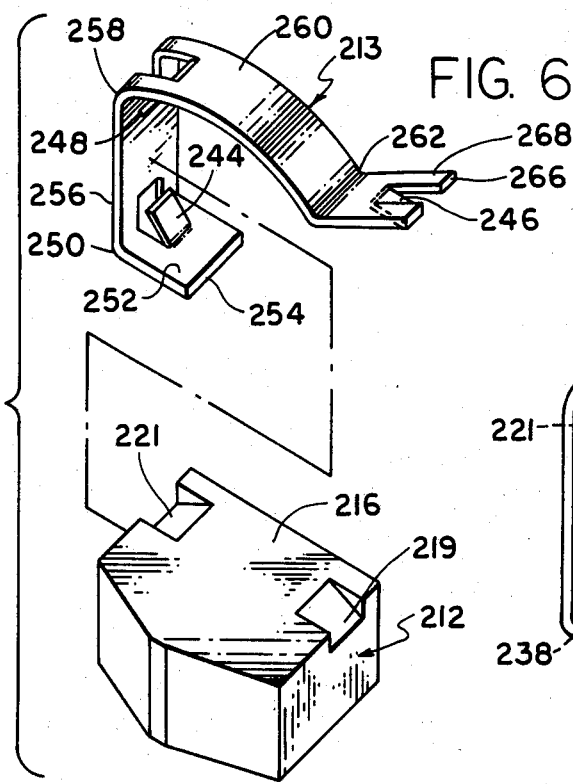
FIG. 6 is an exploded pictorial view of a clip system in accordance with a third embodiment of the invention.

Various alterations and modifications in the structures above-described can be made without departing from the spirit of the invention. For example, the single head groove 18 of the embodiment of FIGS. 1, 2 and 3 may comprise a pair of angled grooves or notches in opposite corner regions of the head as illustrated in the embodiments of FIGS. 4 and 6. Additionally, the notch tang and first and second tangs may comprise concave bends in the corner regions of the clip, as illustrated in the embodiment in FIG. 4. Finally, it will be appreciated that the clip may be permanently fastened to the support with a suitable rivet, screw or other like fastener.

Figure 5:
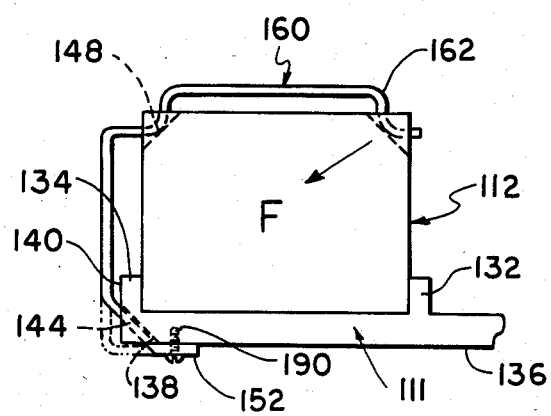
FIG. 5 is a side view illustrating the operation of the embodiment of FIG. 4.

Referring next to FIGS. 4 and 5, a second embodiment of the invention is illustrated comprising an object such as a head 112 generally similar to the head 12 described in conjunction with FIG. 1, but wherein the single groove 18 is replaced with a pair of index cavities, specifically first index cavity 119 and second index cavity 121 through corner regions 106 and 164 between the top surface 116 and the side surface 124 and between the top surface 116 and the opposite side surface 122 respectively.

A clip 113 in accordance with the invention is "C" or "J" shaped, having a base portion 152 beginning at a first end 154. The base 152 transitions at a first bend 150 to an edge portion 156, generally perpendicular to the base 152. The edge portion 156 then transitions at a second corner 158 to a top portion 160 which is generally perpendicular to the edge portion 156. The top portion transitions at a third bend 162 to a lip portion 168 and finally terminates at a second end 166.

The spring clip 113 has a notch indentation or tang 144, which extends across the width of the clip 113 at the first corner region 150. The notch indentation or tang 144 may be simply an inwardly depressed, generally concave indenture made generally at the first corner 150 so as to fit into a suitable support notch 138 in the support 111. The clip 113 further has a first indentation or tang 148 which defines a concavity extending across the width of the clip 113 generally at the second corner region 158. Finally, a second indentation or tang 146 is provided which defines a inwardly directed concave portion extending across the width of the clip 113 in the lip portion 168.

As previously described, the width of the support notch 138, the first index cavity 119 and the second index cavity 121 are substantially the same as the width of the notch tang 144, second tang 146 and the first tang 148 respectively which, as previously described, are the same as the width of the clip 113 in the embodiment illustrated in FIG. 4.

Referring to FIG. 5, the clip 113 may be removeably clamped over the head 112 and the support 111 or the base 152 of the clip 116 may be attached to the support 111 by a suitable screw, rivet or other like fastener 190.

In operation, the second tang 146 exerts a force F in a direction toward the outermost registration flange 134 of the support 111. This force presses the head 112 not only downwardly but outwardly against the registration flange 134. Consequently, an inner registration flange 132, shown in phantom in FIG. 5, is not essential except to resist impacts during shippping and handling.

In accordance with the embodiment of FIG. 5, it will also be appreciated that when the fastener 190 is utilized, the notch tang 144 and the support notch 138 may be eliminated with the first corner 150 simply being a generally right angle corner between the edge 140 and the bottom 136 of the support 111, as illustrated in phantom in FIG. 5.

Figure 7:
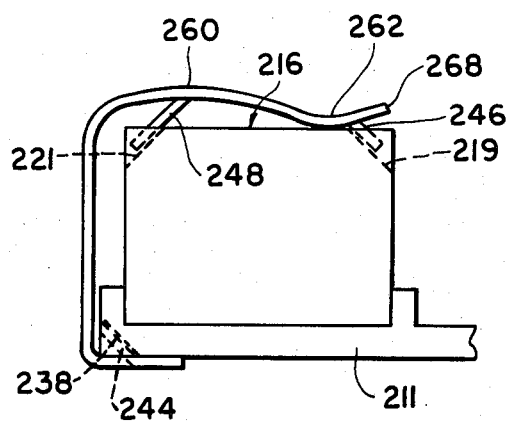
FIG. 7 is a side view of the clip system of FIG. 6.

Turning to FIGS. 6 and 7, yet a third embodiment of the invention is illustrated comprising a head 212 having a first index cavity 219 and a second index cavity 221 such as those described in conjunction with the embodiment of FIG. 4. A clip 213, in accordance with this embodiment of the invention, is generally "C" shaped or "J" shaped and has a base portion 252 beginning at a first end 254. The base 252 transitions at a first bend 150 to an edge portion 256 generally perpendicular to the base 252. The edge portion 256 transitions at a second bend 258 to an arch portion 260 generally perpendicular to the edge portion 256. The arch portion 260 transitions at a third bend 262 to a lip portion 268. The spring clip 213 finally terminates at a second end 266 of the lip portion 268. The clip 213 has a notch indentation or tang 244 generally at or adjacent to the first bend 250 so as to extend generally across the corner of the first bend 250. The clip 213 further includes a first indentation or tang 248 adjacent the second bend 258. A second indentation or tang 246 extends from the upwardly directed lip portion 268 toward the head 212 from the lip portion 268. As with the previously described embodiments, the width of the first and second tangs 248 and 246 are substantially the same as the second and first index cavities 221 and 219 respectively. Similarly, the width of the notch tang 244 is substantially the same as the width of a support notch 238 in the support 211.

Referring to FIG. 7, when the clip 213 is in position the second tang 246 extends into the index cavity 219; the tang 248 extends into and seats in the second index cavity 221; and the notch tang 244 extends up into and seats in the support notch 238. The arched portion 260 is configured in relationship to the edge portion 256 and the bottom portion 252 of the clip 213 so that the third bend 262 presses downwardly against the top 216 of the head 212, thereby pressing the head against the support 211.

As previously stated, the tangs 244 and 248 are not precisely at the bends 250 and 258 but are preferably positioned so as to be near or adjacent to those bends. On the other hand, it is possible to provide a clip with tangs which extend inwardly from any region of the clip with the tangs not necessarily positioned at the corner bend regions.

It will also be appreciated that the tang 246 may extend from the lip portion as illustrated in FIG. 7, or may be such as to extend from the arch portion as illustrated in the embodiment of FIGS. 1 through 3.

It will be appreciated that the structure may be variously implemented and variously used depending upon specific applications. Accordingly, the scope of the invention is in accordance with the claims as set forth below.

What is claimed is:

1. A clip system for mounting an object having a first side and a second side generally opposite each other on a support whereby the object is held translationally immoveable relative to the support along each of a first, second and third mutually perpendicular dimensions, the object having a top surface with a first index cavity in the top surface adjacent the first side and a second index cavity in the top surface adjacent the second side, the clip system comprising:

flange means on the support, the flange means positioned for preventing translational movement of the object in at least one direction along the first dimension;

a clip comprising:
 a base portion,
 a top portion, and
 an edge portion connecting the top and base portions, the object and support being positionable between the top and base portions whereby the clip is in clamping relationship to the object and support for urging the object and support to press against each other in translationally immoveable relationship along the second dimension, means for immovably engaging the clip with the support, and first and second tang means on the clip in fixed positonal relationship to each other, the first tang means located on the clip for engagement with the first index cavity and the second tang means located on the clip for engagement with the second index cavity, each of the first and second tang means being sized to conform to the first and second index cavities respectively, the means for immovably engaging the first and second tang means and the first and second index cavities cooperating for preventing translational movement of the object relative to the support in the third dimension, and for effecting registration of the object along the third dimension when the clip is in clamping relationship on the object and the support.

2. The clip system of claim 1 wherein the flange means comprises a pair of registration flanges in spaced-apart relationship to each other for simultaneously abutting against the first and second sides of the object for preventing translational movement of the object in each of two opposite directions along the first dimension.

3. The clip system of claim 1 wherein support has an edge region with a support notch therein, the means for immoveably engaging the clip with the support comprising a third tang means on the clip located for engagement with the index notch, the third tang means being sized to confirm to the size of the index notch.

4. The clip system of claim 1 wherein the means for immoveably engaging the clip with the support comprises a fastener for fastening and holding the clip to the support.

5. The clip system of claim 1 wherein the first index cavity and the second index cavity are joined to each other to define a single groove in and across the top surface of the object.

6. The clip system of claim 1 wherein the clip further comprises a lip portion extending from the top portion remote from the edge portion and in a direction along the first dimension.

7. The clip system of claim 6 wherein the junction between the top surface of the object and the first side surface defines an object edge and wherein the lip portion extends in a direction toward the object, and the junction between the lip portion and the top portion defines a first bend for fitting generally over the object edge region between the top surface of the object and the first side of the object.

8. The clip system of claim 6 wherein the lip portion extends in a direction away from the object and the junction between the lip portion and the top portion defines a first bend which defines a ridge having an apex directed toward the top surface of the object, the ridge positioned for pressing against the top surface of the object for pressing the object against the support.

9. The clip system of claim 1 wherein the object is a magnetic head.

10. The clip system of claim 6 further comprising a base and a second bend between the edge portion and the top portion wherein the first tang means is located adjacent the second bend and the second tang means is located against the lip portion.

11. The clip system of claim 1 wherein the first tang means comprises a first protrusion on the clip extending inwardly toward the object at a location adjacent the first index cavity whereby the first protrusion of the clip extends into and seats in the first index cavity of the object, and wherein the second tang means comprises a second protrusion on the clip extending inwardly toward the object at a location adjacent the second index cavity whereby the second protrusion on the clip extends into and seats in the second index cavity.

12. The clip system of claim 1 wherein the support has an edge region and a bottom surface intersecting the edge region to define a support corner, the support having a notch in the support corner, wherein the means for immoveably coupling the clip to the support comprises a third tang means in the clip for engagement with the support notch, the third tang means sized to conform to the support notch for preventing translational movement of the object relative to the support in a third dimension when the clip is engaged with the object and the support.

13. The clip system of claim 12 wherein the third tang means comprises a third protrusion on the clip extending inwardly toward the object at a location adjacent the support notch whereby the third protrusion on the clip extends into and seats in the support notch.

14. A spring clip for mounting an object on a support in a predefined fixed position whereby the object is held translationally immoveable relative to the support along each of a first, second and third mutually perpendicular dimensions, the object having a first side surface, a second side surface and a top surface, the top surface having a first index cavity and a second index cavity therein along the first dimension, the support having flange means positioned for preventing movement of the object relative to the support in at least one direction along the first dimension, the spring clip comprising:
   a C-shaped member for being positioned to press the object and the support together in immoveable relationship to each other in the second dimension;
   means for immoveably coupling the C-shaped member to the support;
   first tang means on the C-shaped member for engagement with the first index cavity; and
   second tang means on the C-shaped member for engagement with the second index cavity, the first and second tang means and first and second index cavities located relative to each other for positioning the object and the support in a predefined position relative to each other along the third dimension and holding the object and the support immoveable in the predefined relative position along the third dimension.

15. The clip system of claim 14 wherein the flange means comprises a pair of registration flanges in spaced-apart relationship to each other for simultaneously abutting against the first and second side surfaces of the object for preventing translational movement of the object in each of two opposite directions along the first dimension.

16. The clip of claim 14 wherein the support has an edge region with a support notch therein, the means for immoveably engaging the C-shaped member to the support comprising a third tang means on the C-shaped member located for engagement with the index notch, the third tang means being sized to conform to the size of the index notch.

17. The clip of claim 14 wherein the means for immoveably engaging the C-shaped member with the support comprises a fastener for fastening and holding the clip to the support.

18. The clip of claim 14 wherein the C-shaped member further comprises:
   a base portion;
   a top portion;
   an edge portion connecting the top and base portions; and
   a lip portion extending from the top portion remote from the edge portion and in a direction along the first dimension.

19. The clip of claim 18 wherein the junction between the top surface of the object and the first side surface defines an object edge and wherein the lip portion extends in a direction toward the object, and the junction between the lip portion and the top portion defines a first bend for fitting generally over the object edge region between the top surface of the object and first side of the object.

20. The clip of claim 18 wherein the lip portion extends in a direction away from the object and the junction between the lip portion and the top portion defines a first bend which defines a ridge having an apex directed toward the top surface of the object, the ridge positioned for pressing against the top surface of the object for pressing the object against the support.

21. The clip of claim 18 wherein the C-shaped member further comprises a second bend between the edge portion and the top portion, wherein the first tang means is located adjacent the second bend and the second tang means is located adjacent the lip portion.

22. The clip of claim 14 wherein the first tang means comprises a first protrusion on the C-shaped member extending inwardly toward the object at a location adjacent the first index cavity, whereby the first protrusion of the C-shaped member extends into and seats in the first index cavity of the object, and wherein the second tang means comprises a second protrusion on the C-shaped member extending inwardly toward the object at a location adjacent the second index cavity whereby the second protrusion on the C-shaped member extends into and seats in the second index cavity.

23. The clip system of claim 14 wherein the support has an edge region and a bottom surface intersecting the edge region to define a support corner, the support having a support notch in the support corner, wherein the means for immoveably coupling the C-shaped member to the support comprises a third tang means in the C-shaped member for engagement with the support notch, the third tang means sized to conform to the support notch for preventing translational movement of the object relative to the support when the C-shaped member is engaged with the object and the support.

24. The clip of claim 23 wherein the third tang means comprises a third protrusion on the C-shaped member extending inwardly toward the object at a location adjacent the support notch whereby the third protrusion on the C-shaped member extends into and seats in the support notch.

25. The clip of claim 18 wherein the top portion is arched whereby a center region of the top portion is spaced away from the top surface of the object.

26. A magnetic head mounting and registration system for positioning the head against a magnetic recording surface comprising:

a support member having a top support surface, a bottom support surface opposite the top support surface, an outer edge defining a connecting surface between the top support surface and the bottom support surface, a first registration flange on the top support surface, extending away from the top support surface, and a second registration flange on the top surface, spaced a first distance from the first registration flange and extending away from the top support surface, the second registration flange being nearer the outer edge than the first registration flange, the support having an index notch having a first width in the corner region between the outer edge and the bottom support surface;

a head having a bottom head surface, a top head surface opposite the bottom head surface, a front head surface connecting the top and bottom head surfaces and having a magnetic contact area extending between the top and bottom head surfaces, a first side surface and a second side surface spaced from the first side surface a second distance substantially the same but very slightly smaller than the first distance for enabling the head to be positioned between the first and second registration flanges with the bottom head surface adjacent the top surface, for inhibiting side-to-side movement of the head between the first and second registration flanges, the head further having a first index cavity and a second index cavity in the top head surface, each cavity having a second width; and a C-shaped clip having a base-portion, an edge portion, a first bend connecting the base portion to the edge portion, an arch portion, a second bend connecting the arch portion to the edge portion remote from the first bend, a lip portion, a third bend connecting the lip portion to the arch portion remote from the second bend, a notch tang having a third width near the first bend, a first tang, having a fourth width, near the second bend and a second tang having a fifth width near the third bend, the clip being dimensioned so that the base portion presses up against the bottom support surface and the arch portion presses down against the top head surface to hold the head with the bottom head surface immoveable pressed against the top support surface, the third width being substantially the same as the first width whereby the notch tang extends into and fits tightly in the index notch, the second, fourth and fifth widths being substantially the same whereby the first and second tangs fit tightly in the first and second index cavities, respectively, the arch portion being sized so that the third bend fits over the corner region between the top head surface and the first side surface, the notch tang and the first and second tangs holding the head immoveable against movement parallel to the registration flanges, the notch tang and first and second tangs positioned relative to each other so as to position the head relative to the support in a predefined position whereby the contact area contacts the magnetic recording surface.

* * * * *